United States Patent
Le Blanc et al.

(10) Patent No.: US 12,091,192 B2
(45) Date of Patent: Sep. 17, 2024

(54) SYSTEM AND METHOD FOR IMPROVED SECURING OF AN AEROSTAT TO A RECEIVING STRUCTURE

(71) Applicant: Flying Whales, Suresnes (FR)

(72) Inventors: Benoît Le Blanc, Paris (FR); Bastien Lefrancois, Chaville (FR)

(*) Notice: Subject to any disclaimer, the term of this patent is extended or adjusted under 35 U.S.C. 154(b) by 501 days.

(21) Appl. No.: 17/416,970

(22) PCT Filed: Dec. 18, 2019

(86) PCT No.: PCT/FR2019/053136
§ 371 (c)(1),
(2) Date: Jun. 21, 2021

(87) PCT Pub. No.: WO2020/128316
PCT Pub. Date: Jun. 25, 2020

(65) Prior Publication Data
US 2022/0063838 A1    Mar. 3, 2022

(30) Foreign Application Priority Data

Dec. 21, 2018  (FR) ...................................... 1874017

(51) Int. Cl.
*B64F 1/14* (2006.01)
*B64B 1/66* (2006.01)
*B66D 1/12* (2006.01)
*B66D 1/34* (2006.01)

(52) U.S. Cl.
CPC .................. *B64F 1/14* (2013.01); *B64B 1/66* (2013.01); *B66D 1/34* (2013.01); *B66D 1/12* (2013.01)

(58) Field of Classification Search
CPC .. B64F 1/14; B64B 1/66; B64U 10/60; B66D 1/40
See application file for complete search history.

(56) References Cited

U.S. PATENT DOCUMENTS 4,842,221 A * 6/1989 Beach ....................... B64B 1/50
                                                                244/33
2021/0323799 A1* 10/2021 Coles ....................... B66D 1/60

FOREIGN PATENT DOCUMENTS

| CN | 203728466   |   | 7/2014  |               |
|----|-------------|---|---------|---------------|
| CN | 108313257 A | * | 7/2018  | ... B60K 7/00 |
| DE | 19924468 A1 |   | 11/2000 |               |

(Continued)

OTHER PUBLICATIONS

International Search Report for International Application No. PCT/FR2019/053136 dated May 28, 2020, 2 pages.
(Continued)

*Primary Examiner* — Timothy D Collins
*Assistant Examiner* — Justin Michael Heston
(74) *Attorney, Agent, or Firm* — TraskBritt

(57) ABSTRACT

A tie-down system for securing an aerostat to a receiving structure, comprising a tie-down cable designed to be attached to the aerostat by one of the ends thereof, a mast designed to be rotatably mounted on the receiving structure, the mast comprising a winch with a winding drum winch comprising a slot designed to receive a portion of the cable located on the side of the other end of the tie-down cable. The tether is weighed down by a weight at the other end thereof, and the mast further comprises a forked guide device having two branches extending in two opposite directions.

20 Claims, 3 Drawing Sheets

(56) References Cited

FOREIGN PATENT DOCUMENTS

| EP | 2218642 A2 * | 8/2010 | ............. B64C 25/68 |
|----|----|----|----|
| EP | 2218642 B1 | 4/2014 | |
| WO | 2004/087499 A3 | 10/2004 | |
| WO | 2018/099870 A1 | 6/2018 | |

OTHER PUBLICATIONS

International Written Opinion for International Application No. PCT/FR2019/053136 dated May 28, 2020, 9 pages.

* cited by examiner

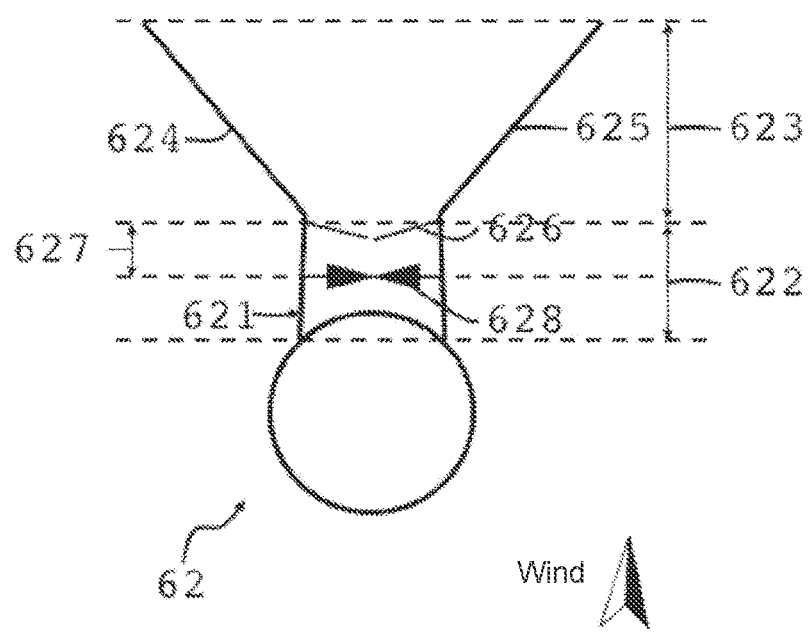
*FIG. 3*
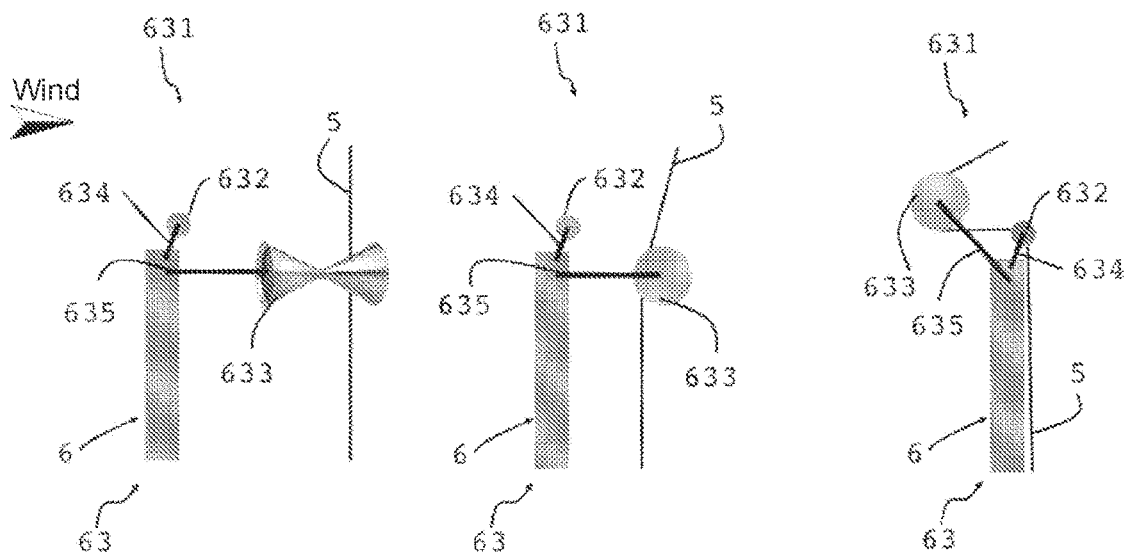
*FIG. 4A*   *FIG. 4B*   *FIG. 4C*

SYSTEM AND METHOD FOR IMPROVED SECURING OF AN AEROSTAT TO A RECEIVING STRUCTURE

CROSS-REFERENCE TO RELATED APPLICATIONS

This application is a national phase entry under 35 U.S.C. § 371 of International Patent Application PCT/FR2019/053136, filed Dec. 18, 2019, designating the United States of America and published as International Patent Publication WO 2020/128316 A1 on Jun. 25, 2020, which claims the benefit under Article 8 of the Patent Cooperation Treaty to French Patent Application Serial No. 1874017, filed Dec. 21, 2018.

TECHNICAL FIELD

The present disclosure relates to a system for securing an aerostat to a mobile or fixed receiving structure. It also covers a securing process implemented in this system.

The technical field is more particularly, but not restrictively, that of dirigible balloons.

BACKGROUND

Tie-down of large airships to parking masts has always been a delicate maneuver that required the intervention of a large number of ground personnel, sometimes more than 100, and was time-consuming and risky for both the crews of these airships and the people on the ground. This also represented significant operating costs.

Moreover, the piloting of these airships on approach to ground receiving structures is generally complex due to aerodynamic conditions sometimes unfavorable to the approach to the ground and the high intrinsic inertia of these aircraft.

The applicant filed application WO2018099870A1, which describes a tie-down system that facilitates the approach of an aerostat to a receiving structure and allows it to be tied down more easily and more securely than under previous conditions.

For this purpose, a system has been proposed for securing an aerostat to a receiving structure, comprising a controllable aerial drone for moving between the aerostat and the receiving structure carrying a first end of a cable, the second end of which is attached to the aerostat or the receiving structure, and for attaching the first end to the receiving structure or the aerostat, whereby the cable connects the aerostat to the receiving structure.

The applicant continued its research with a view to proposing a system that still aims to facilitate the approach of an aerostat to a receiving structure and allows it to be stowed more easily and more securely than under current conditions, while simplifying the previously proposed solution.

BRIEF SUMMARY

A particular object of the disclosure is to overcome all or part of the above drawbacks.

According to a first aspect of the disclosure, a system for securing an aerostat to a receiving structure is proposed, comprising:

A tie-down cable arranged to be attached to the aerostat by one of its ends, a mast arranged to be rotatably mounted on the receiving structure, the mast comprising a winding drum winch having a slot arranged to receive a portion of the cable located on the side of the other end of the tie-down cable.

According to the first aspect of the disclosure, the tie-down cable is weighed down by a weight at its other end, and the mast further comprises a fork guide device having two branches extending in two divergent directions.

Advantageously, the tie-down cable and the fork guide are made of electrically conductive materials. This characteristic allows an electrostatic discharge of the aerostat.

In one possibility, the guiding device has a trapping device separating the guiding device into a proximal part and a distal part, the distal part comprising the two legs, the trapping device being arranged to prevent part of the weighted cable present in the proximal part from reaching the distal part. This feature has the effect of preventing unintentional departure of the cable. It can also be provided to control the trapping device so that it has an unlocked position in which the cable is no longer trapped.

Preferably, the system according to the disclosure may comprise a cable passage detector having a detection axis at the level of the trapping device. In this way, it is possible to circumscribe the location of the cable section in the subsection on the mast side.

As an example, the mast may also have a tie-down cable catching device between the guide device and the drum winch.

It is also provided that the tie-down cable may display distance data written along the tie-down cable and that the mast is fitted with a reader for such distance data.

The system according to the disclosure may advantageously include a motor for rotating the drum winch and a controller configured to drive the motor from the data read by the reader.

According to a second aspect of the present disclosure, a kit is disclosed comprising:

A tie-down cable arranged to be attached to the aerostat by one of its ends, a mast arranged to be rotatably mounted on the receiving structure, the mast comprising a winding drum winch having a slot arranged to receive a portion of the cable located on the side of the other end of the tie-down cable.

The tie-down cable is weighed down by a weight at its other end, and the mast further comprises a fork guide device having two branches extending in two divergent directions.

Of course, the mast may have one or more of the above-mentioned improvements in relation to the first aspect of the disclosure.

According to a third aspect of the present disclosure, a method is disclosed for securing an aerostat to a receiving structure, implemented in a system according to the first aspect of the disclosure, or one or more of its improvements, comprising the following steps, after releasing the securing cable weighed down by the aerostat:

guidance of the tie-down cable by the fork of the system having two branches, placing the tie-down cable in the winding drum winch having the slot for winding the cable, and rotating the winding drum winch.

According to yet another aspect of the disclosure, a computer program product is provided, downloadable from a communication network and/or stored on a medium readable by a computer and/or executable by a microprocessor, and loadable into an internal memory of a computing unit, comprising program code instructions that, when executed by the computing unit, implement the process steps according to the third aspect of the disclosure, or one or more improvements thereof.

BRIEF DESCRIPTION OF THE DRAWINGS

Other advantages and features of the present disclosure will appear on reading the following detailed description of embodiments and implementations that are in no way limiting, and on observing the following accompanying figures:

FIG. 3 is a top view of the mast shown in FIG. 2, at the guide device;

FIG. 4A, FIG. 4B, and FIG. 4C are three lateral views of the mast shown in FIG. 2, in the descent plane of the aircraft, in three distinct positions of the mast capture device.

DETAILED DESCRIPTION

The above-mentioned embodiments are in no way limiting. Therefore, it is possible, in particular, to consider variants of the disclosure that have only a selection of characteristics described below that are isolated from the other characteristics described, if this selection of characteristics is sufficient to impart a technical advantage or to distinguish the disclosure from the prior art. The selection includes at least one preferably functional characteristic without structural details, or with only a fraction of the structural details if that fraction is sufficient to impart a technical advantage or to distinguish the improvement over the prior art.

In the figures, an element appearing in more than one figure is given the same reference in every figure in which it appears.

Figure 1:
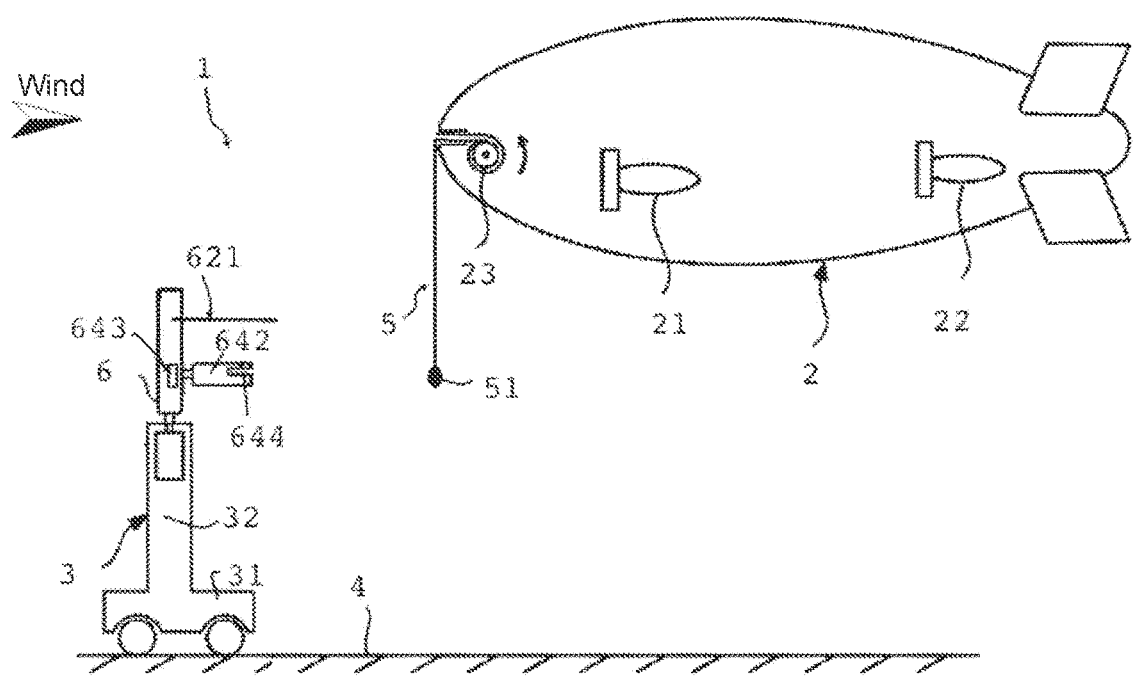
FIG. 1 schematically illustrates a first example of the implementation of a tie-down system according to the disclosure.

With reference to FIG. 1, an example of an embodiment of a tie-down system 1 is described, according to the disclosure, from an aerostat 2 to a receiving structure 3.

In the example shown, the aerostat 2 has drive units 21, 22 and a winding drum 23 with a substantially horizontal axis of rotation, the winding drum 23 being arranged in front of the aerostat 2.

The receiving structure 3 consists of a base 31, possibly self-propelled, resting on a ground or runway 4, and a tower 32 mounted on the base 31.

The tie-down system 1 comprises:
- a tie-down cable 5 arranged to be attached to the winding drum 23 by one end and weighed down by a weight 51 at its other end,
- a mast 6 arranged to be rotatably fixed on a vertical axis of the receiving structure 3, and more precisely on the tower 32.

In the example shown, tie-down cable 5 is electrically conductive.

Figure 2:
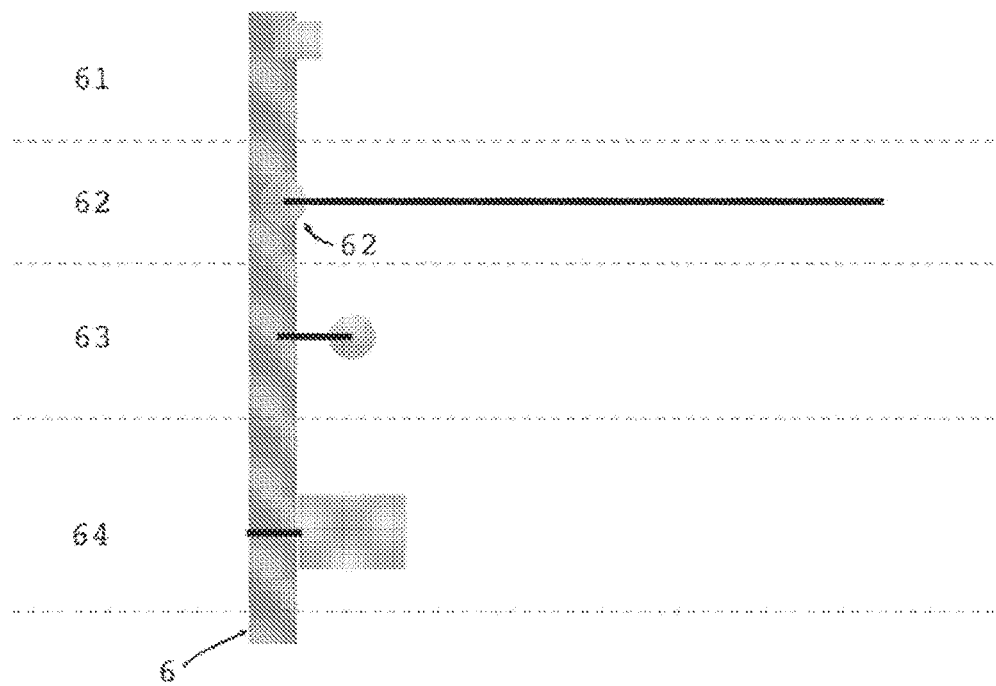
FIG. 2 is a side view of a mast of the system shown in FIG. 1, in the descent plane of the aircraft.

FIG. 2 illustrates the different functional areas of mast 6 according to the disclosure.

The mast has:
- a mast head area 61 arranged to be mechanically connected to aerostat 2, then
- a guide area 62 of the tie-down cable 5, then
- a catching part 63 of the tie-down cable 5, then
- a catching area 64 to pull the tie-down cable 5 and store it.

These areas are arranged from the top to the bottom of mast 6 in the order shown.

Description of Guide Area 62

Referring to FIG. 3, the mast 6 is equipped at the level of the guide area 62 with a forked guide device 621.

The forked guide device 621 comprises a proximal part 622 having a U-shaped conformation, and an end (distal) part 623 having two legs 624 and 625, each of the legs extending in two diverging directions from an upper end of a vertical bar of the U of the proximal part.

The fork is also electrically conductive in order to allow the electrostatic discharge of aerostat 2 when the tie-down cable 5 comes into contact with one of the two legs 624 and 625.

Electrical conduction is also ensured between the forked guide device 621, the trapping device 626 and the ground.

Along the movement of the airship toward the axis of the mast, the cable is guided by the fork toward the mast.

The guiding device 621 has a trapping device 626 separating the proximal part 622 from the end (distal) part 623.

The forked guide device 621 has two segments, arranged substantially in the same plane as that formed by the two legs 624 and 625, each having one end facing the proximal part 622 of the forked guide device 621 and having one end arranged at the end of the leg connected to the vertical end of the U of the forked guide device 621. The primary purpose of trapping device 626 is to prevent the cable from exiting once it has entered the proximal part 622.

Of course, the trapping device 626 can be retracted to allow the tie-down cable 5 to be released.

The forked guide device 621 also has a cable passage detector at the trapping device 626, which is arranged to functionally separate the proximal part 622 of the fork from its distal part 623.

A fork pulley 628, in the shape of a diabolo according to the example shown, is rotatably mounted on the vertical U-bar of the forked guide device 621, between the vertical U-bars.

More generally, the function of the fork pulley 628 is to drive the tie-down cable 5 from any point across the width of the proximal part 622 to the center of the proximal part 622.

Description of the Catching Part 63

Referring to FIGS. 4A-4C, the mast 6 is equipped at the level of the catching part 63 with a pulley catcher 631.

In FIG. 4A, the pulley catcher 631 is in a free position.

In FIG. 4B, the pulley catcher 631 is in an intermediate catch position.

In FIG. 4C, the pulley catcher 631 is in a final catch position.

A portion of the tie-down cable 5 is shown in each of FIGS. 4A-4C.

The pulley catcher 631 has two pulleys, respectively, one fixed pulley 632 and one mobile pulley 633.

The fixed pulley 632 has an axis of rotation perpendicular to the descent plane of aerostat 2 and is carried by an arm 634 so that its groove is positioned in the descent plane of the aircraft, downwind of the mast at a distance aligned with slot 644 of the guidance system.

The mobile pulley 633 is of diabolo type.

More generally, the function of the mobile pulley 633 is to drive the tie-down cable 5 from any point across the width of the pulley to the center of the pulley.

The axis of the mobile pulley 633 is mounted rotatably on an arm 635.

As shown in FIG. 4A, the mobile pulley 633 can have a first position, called free, in which the axis of rotation of the pulley is in the descent plane of aerostat 2, and is preferably perpendicular to the longitudinal axis of mast 6.

As shown in FIG. 4B, the mobile pulley 633 can have a second position, called catch position, in which the axis of rotation of the pulley is perpendicular to the descent plane of the aircraft, and is preferably perpendicular to the longitudinal axis of mast 6.

Moving from the free position of the pulley to the catch position of the pulley allows the capture of the tie-down cable 5.

The arm 635 is rotatably mounted on mast 6 along an axis of rotation perpendicular to the plane of descent of the aircraft.

The arm 635 can be positioned in an intermediate catching position, preferably orthogonal to mast 6 and in which the arm 635 is perpendicular to mast 6 and pointing downwind, as shown in FIG. 4B.

The arm 635 can be positioned in a final catching position, shifting its throat to windward of the leeward throat of fixed pulley 632, as shown in FIG. 4C.

In this final catching position, the tie-down cable 5 is guided by mobile pulley 633 before being guided by fixed pulley 632.

Description of Catching Area 64

Figure 5:
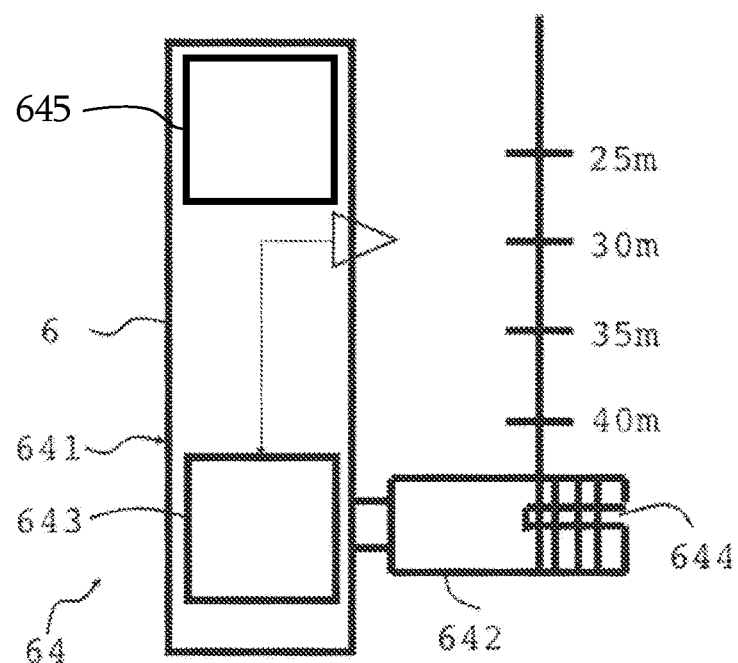
FIG. 5 shows a side view of the mast shown in FIG. 2, in the descent plane of the aircraft, at the level of the storage device.

With reference to FIG. 5, mast 6 is equipped at catching area 64 with a device 641 to pull and store the tie-down cable 5.

Device 641 has a winding drum winch 642, the shaft of which is driven by a motor 643. The axis of the winding drum is horizontal. Winding drum 642 has a slot 644 designed to receive the weighted end of the tie-down cable 5.

The cable contains distance data between the aerostat and the mast head area 61, as shown in FIG. 5.

In addition, device 641 has a distance data reader 645 carried by the tie-down cable 5.

The distance data read by the distance data reader 645 can be used to control the speed of motor 643.

Description of the Mast Head Area 61

The mast head area has means for mechanically locking the mast 6 with the aerostat 2.

The mast head area includes means of maintenance connections for the integrated systems of aerostat 2.

Securing Method Implemented in this System.

When aerostat 2 is approaching receiving structure 3, the pilot initiates a landing procedure.

The head of the mast 6, which is rotatably mounted on tower 32, is oriented so that the bisector of the angle formed by the two branches (or legs) 624 and 625 is downwind, in the opposite direction to the wind flow.

The length and angle between the two legs 624 and 625 are sufficient to allow the pilot to bring the tie-down cable 5 between them, given the airship's precision capabilities.

The unwinding of winding drum 23 is controlled so as to release the unwound rope and allow ballast weight 51 to pull on the rope while limiting tensile forces.

Before part of the tie-down cable 5 touches the fork pulley 628, it cuts the detection axis of the trapping device 626 and is thus detected by a control unit (not shown).

The control unit is configured to start the tie-down cable capture process upon detection of the presence of the tie-down cable in zone 627.

The catching part 63, which is initially in its free position, switches to the intermediate catching position, in which the cable is caught, and then to the final catching position, in which the cable passes through the mobile pulley and then through the fixed pulley.

Once the cable is correctly positioned inside slot 644, the winding drum winch 642 is rotated by motor 643 to wind the tie-down cable 5 and bring the airship to the mast head area 61. The end of the tie-down cable 5 can be equipped with a stop device to prevent slipping on the drum.

While rewinding the tie-down cable 5 by the winding drum winch 642, the legs of the forked guide device 621 can be moved away from the body of the aerostat 2 to prevent contact with the aerostat 2.

At the end of the rewind, the nose of aerostat 2 is correctly positioned on the mast head area 61. The connection is then mechanically locked. Means can be provided to automatically provide maintenance connections for embedded systems.

Once the connection is locked, the cable can be rewound in the aerostat 2.

Of course, the disclosure is not limited to the above-described examples and numerous changes can be made to these examples without departing from the scope of the disclosure. Furthermore, the various characteristics, shapes, alternative solutions and embodiments of the disclosure can be associated together in various combinations whenever they are not conflicting or mutually exclusive.

The invention claimed is:

1. A system for securing an aerostat to a receiving structure, comprising:
   a tie-down cable having a first end and a second end opposite the first end, the tie-down cable being attached to the aerostat by the first end;
   a mast rotatably mounted on the receiving structure, the mast comprising a winding drum winch, the winding drum winch comprising a slot configured to receive a portion of the tie-down cable located on a side of the second end of the tie-down cable;
   wherein:
   the tie-down cable comprises a weight at the second end thereof; and
   the mast further comprises a forked guide device having two branches extending in two divergent directions, and a pulley capture device having a movable pulley adapted to receive the tie-down cable.

2. The system of claim 1, wherein the tie-down cable and the forked guide device comprise an electrically conductive material.

3. The system of claim 1, wherein the forked guide device has a trapping device separating the forked guide device into a proximal part and a distal part, the distal part comprising the two branches, the trapping device being arranged to prevent part of the tie-down cable present in the proximal part from reaching the distal part.

4. The system of claim 3, further comprising a cable passage detector having a detection axis at the trapping device.

5. The system of claim 1, wherein the mast further comprises a tie-down cable catching device disposed between the forked guide device and the winding drum winch.

6. The system of claim 1, wherein the tie-down cable has distance data written along the tie-down cable and wherein the mast has a reader for the distance data.

7. The system of claim 6, further comprising a motor for rotating the winding drum winch and a controller configured to drive the motor based on data read by the reader.

8. A kit, including:
- a tie-down cable having a first end and a second end opposite the first end, the tie-down cable being attached to an aerostat by the first end;
- a mast arranged rotatably mounted on a receiving structure, the mast comprising a winding drum winch, the winding drum winch comprising a slot configured to receive a portion of the tie-down cable located on a side of the second end of the tie-down cable;

wherein:
- the tie-down cable comprises a weight at the second end thereof; and
- the mast further comprises a forked guide device having two branches extending in two divergent directions, and a pulley capture device having a movable pulley adapted to receive the tie-down cable.

9. A method for securing an aerostat to a receiving structure, implemented in a docking system comprising a tie-down cable having a first end and a second end opposite the first end, the tie-down cable being attached to the aerostat by the first end, a mast rotatably mounted on the receiving structure, the mast comprising a winding drum winch, the winding drum winch comprising a slot configured to receive a portion of the tie-down cable located on a side of the second end of the tie-down cable, the mast further comprising a forked guide device having two branches extending in two divergent directions, a trapping device including a fork pulley, and a pulley capture device having a movable pulley and a fixed pulley adapted to receive the tie-down cable, the method comprising the following steps:
- orienting the mast so that a bisector of an angle formed by the two branches and of the forked guide device is downwind, in an opposite direction to a wind flow;
- unwinding the tie-down cable from the aerostat in a controlled manner so as to release the tie-down cable and allow a weight disposed on a side of the second end of the tie-down cable to pull on the tie-down cable while limiting tensile forces on the tie-down cable;
- detecting that the tie-down cable cuts a detection axis of the trapping device before part of the tie-down cable touches the fork pulley; and
- once the tie-down cable is positioned in the slot of the winding drum winch, rotating the winding drum winch using a motor to wind the tie-down cable and bring the aerostat toward the mast.

10. The method of claim 9, further comprising, upon detection of a presence of the tie-down cable in a zone located between the trapping device and the fork pulley, switching the pulley capture device from a first free position to an intermediate catching position in which the tie-down cable is caught, and then to a final catching position in which the tie-down cable passes through the movable pulley and then through the fixed pulley of the pulley capture device.

11. The method of claim 9, further comprising mechanically locking a nose of the aerostat to a head of the mast.

12. The method of claim 11, further comprising rewinding the tie-down cable toward the aerostat after mechanically locking the nose of the aerostat to the head of the mast.

13. A non-transitory computer-readable medium storing instructions thereon that, when executed by at least one processor, cause the at least one processor to perform a method according to claim 9.

14. The system of claim 2, wherein the forked guide device has a trapping device separating the forked guide device into a proximal part and a distal part, the distal part comprising the two branches, the trapping device being arranged to prevent part of the tie-down cable present in the proximal part from reaching the distal part.

15. The system of claim 14, further comprising a cable passage detector having a detection axis at the trapping device.

16. The system of claim 15, wherein the mast further comprises a tie-down cable catching device disposed between the forked guide device and the winding drum winch.

17. The system of claim 16, wherein the tie-down cable has distance data written along the tie-down cable and wherein the mast has a reader for the distance data.

18. The system of claim 17, further comprising a motor for rotating the winding drum winch and a controller configured to drive the motor based on data read by the reader.

19. The system of claim 1, wherein the moveable pulley is mounted on an arm, the arm being rotatably mounted on the mast along an axis of rotation that extends perpendicular to a plane of descent of the aerostat.

20. The system of claim 19, wherein the moveable pulley is rotatably mounted to the arm along an axis of rotation parallel to a longitudinal axis of the mast.

* * * * *